United States Patent [19]
Karkau et al.

[11] 3,857,602
[45] Dec. 31, 1974

[54] MOUNTING FOR TILT CAB VEHICLES
[75] Inventors: Lawrence E. Karkau, Lansing; Samuel G. Rusco, Diamondale, both of Mich.
[73] Assignee: Diamond Reo Trucks, Inc., Lansing, Mich.
[22] Filed: Jan. 29, 1973
[21] Appl. No.: 327,665

[52] U.S. Cl............ 296/35 A, 105/453, 180/89 A
[51] Int. Cl............................................ B62d 33/06
[58] Field of Search....... 296/35 R, 35 A; 180/89 A; 105/453, 171

[56] References Cited
UNITED STATES PATENTS
2,485,794 10/1949 Waterbury et al................ 296/35 R
2,708,134 5/1955 Sewelin et al..................... 296/35 R

*Primary Examiner*—David Schonberg
*Assistant Examiner*—John A. Pekar
*Attorney, Agent, or Firm*—Irvin L. Groh

[57] ABSTRACT

A mounting mechanism for the rear portion of a tilting cab on a motor vehicle which securely locks and supports the cab relative to the vehicle frame but which may be unlocked to permit tilting of the cab. The mounting includes a support mechanism which is released upon excessive twist of the frame to permit limited movement or separation of the cab and the frame to avoid twisting and distortion and possibly permanent damage to the cab.

10 Claims, 6 Drawing Figures

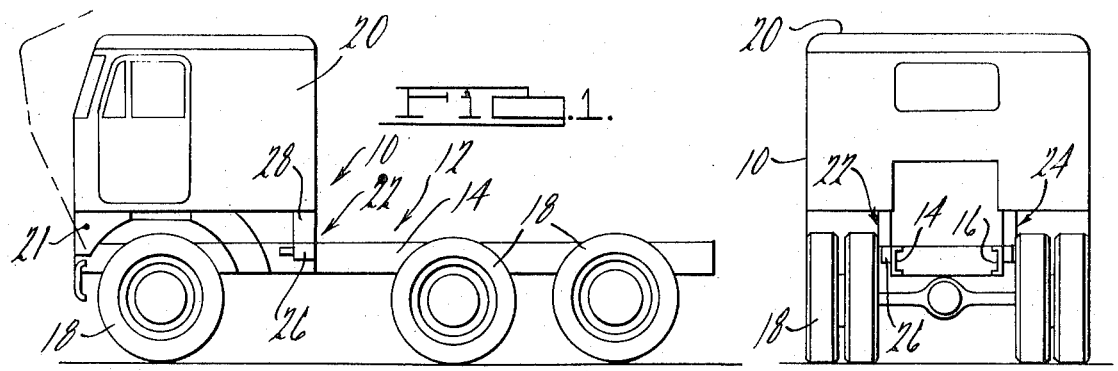
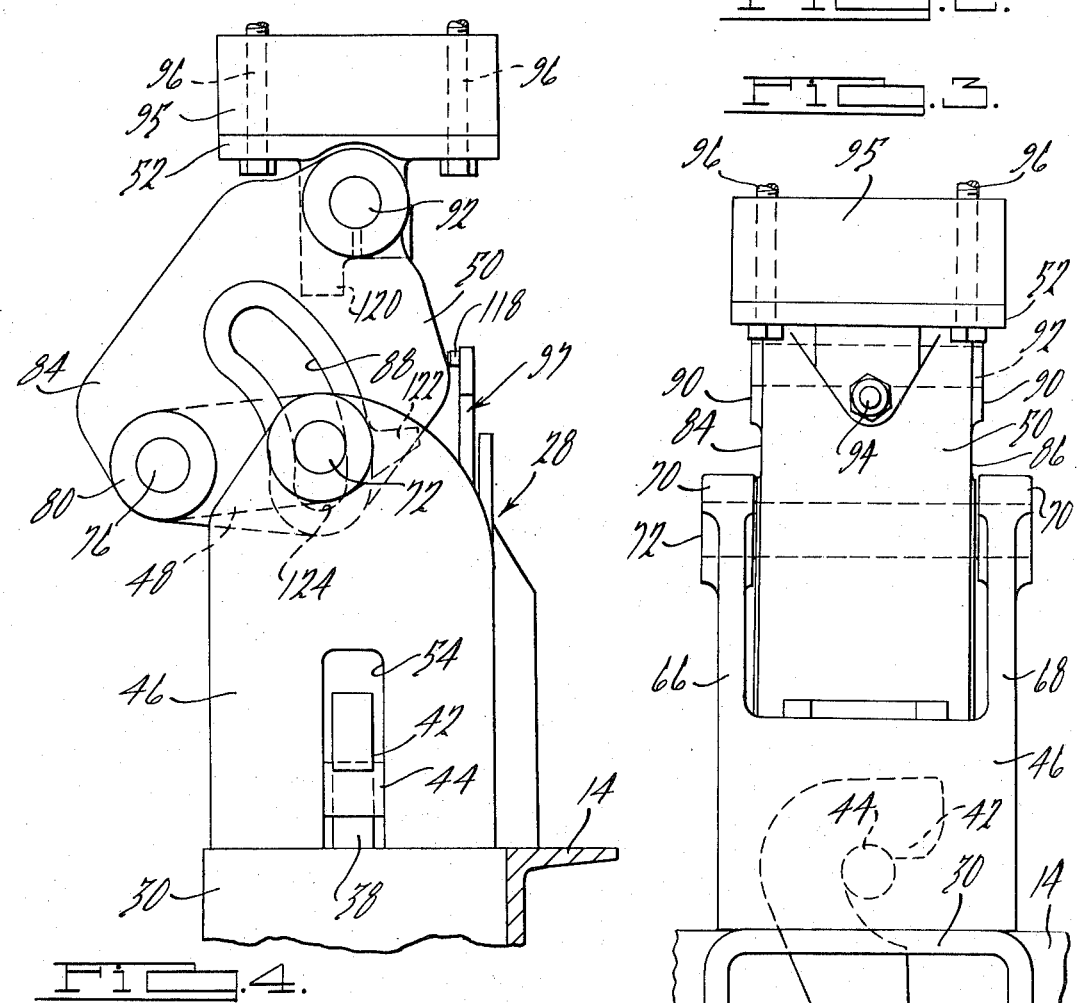
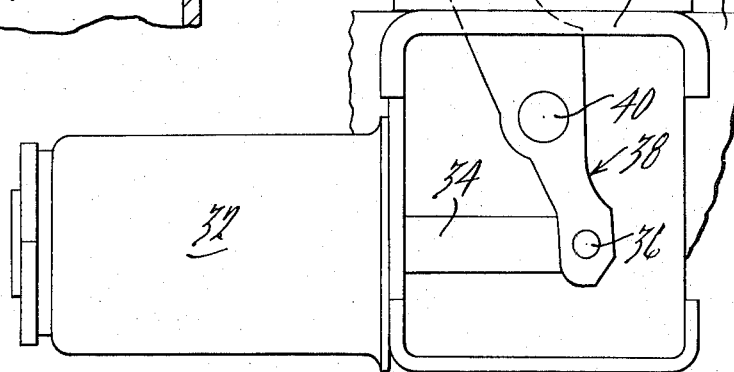

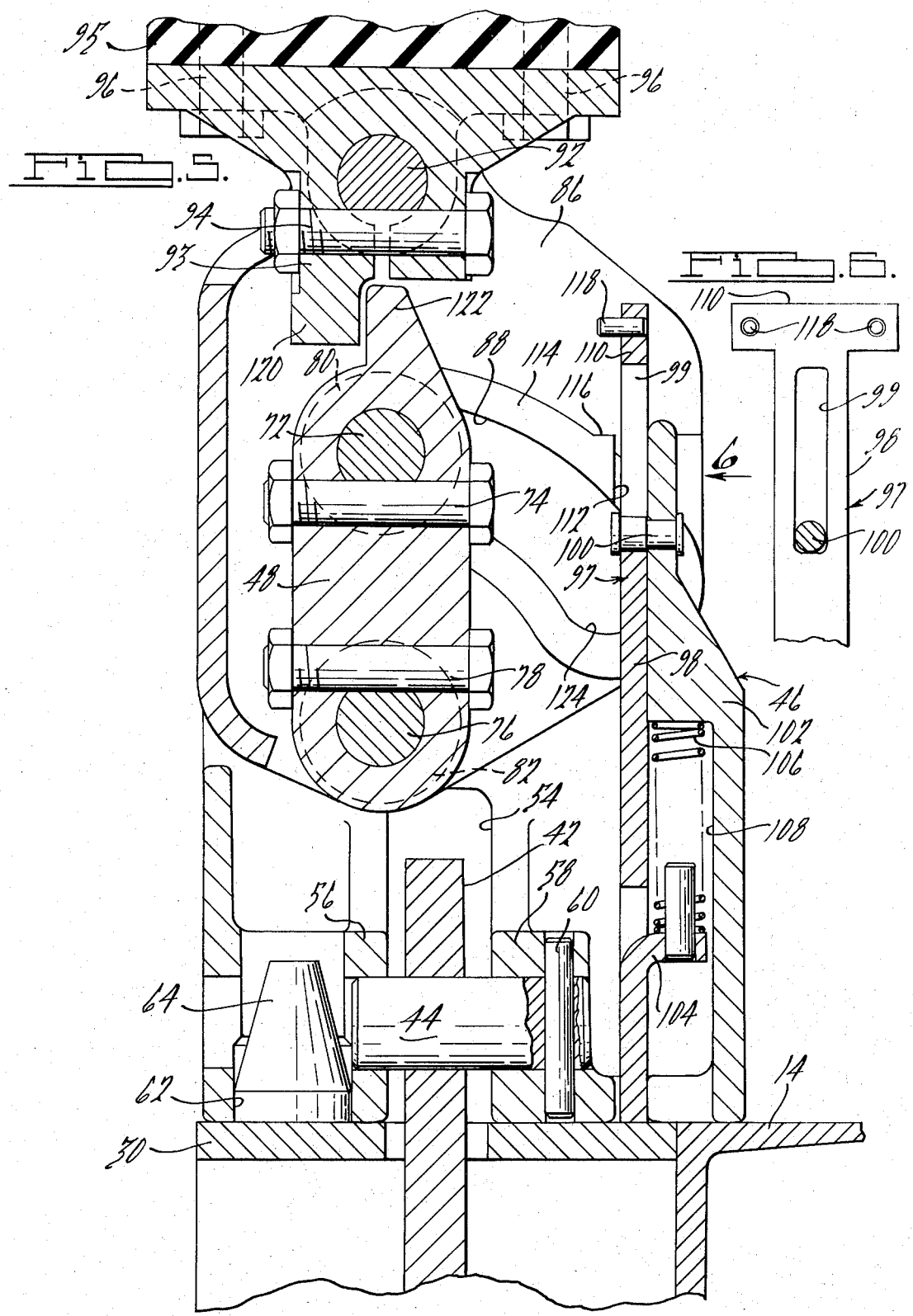

MOUNTING FOR TILT CAB VEHICLES

SUMMARY OF THE INVENTION

This invention relates to mounting mechanism for the rear portion of tilting cabs on motor vehicles and more particularly to a mounting mechanism by which the vehicle cab is supported and locked relative to the vehicle frame at a pair of spaced points at the rear of the cab.

In cab-over-engine type trucks, the operators cab is a relatively rigid structure hinged at its forward end to opposite sides of the chassis frame so that the entire cab may be pivoted upwardly and forwardly about a transverse axis formed by the hinges. In some instances cabs are tilted almost 90 degrees from their normal position to afford access to the engine and its various associated accessories. The rear of such cabs must be positively but releasably mounted relative to the chassis frame in a manner which will permit releasing for tilting of the cab but which will positively lock the cab to the frame and still allow movement of the rear of the cab relative to the frame during twisting of the latter. Such frame twisting occurs whenever one of the vehicle wheels is elevated a substantial distance relative to the remaining wheels as when the vehicle is operated on rough terrain. If the cab is rigidly supported relative to the frame without any provision being made for separation of the cab and frame, the twisting of the frame will also twist the cab causing distortion of the cab and possible damage.

It is not uncommon to mount the rear of the tilting cab at a central point which, although it accommodates twisting of the frame relative to the cab, is an undesirable form of mounting because it either obstructs the free access of the rear portion of the engine which is required for the usual location and positioning of drive train mechanism and other devices or it requires elaborate and costly structure in an effort to avoid the obstruction and to give the necessary access. Consequently, an alternate form of mounting which also is conventional is to mount the rear of tilting cabs at a pair of spaced points at opposite sides of the vehicle frame similar to the location of the spaced hinge points at the front of the tilting cab. Such mounting mechanisms avoid the usual problems of interference with access to the rear portion of the engine but introduces additional problems when attempts are made to accommodate frame twisting and insulate such twisting from the cab. Since the forward part of the cab is secured at a pair of fixed hinge points, the mounting of the rear of the cab at a pair of similarly spaced points transmits frame twist to the cab unless provision is made to permit separation of the cab and frame at least at one of the two mounting points. Such separation is sometimes provided for by spring devices which are undesirable since additional provisions must be made to dampen the action of the spring devices to insure that the cab is secured to the frame firmly and so that normal frame vibrations during road operation do not set up cab vibrations or even more seriously, bound and rebound of the cab relative to the chassis frame.

It is a general object of the invention to provide a mounting for spaced points at the rear of a tilting cab which positively locks the cab to the frame and yet prevents excessive twisting of the frame from being transmitted to the cab.

Another object of the invention is to provide a mounting mechanism which releasably supports the rear of a cab for tilting but which securely locks the cab to the frame during normal operation and yet permits limited relative movement upon excessive twisting of the frame.

Still another object of the invention is to provide a mounting mechanism which secures the rear of a tilting cab to a vehicle frame until the frame undergoes excessive twisting at which time at least one of a pair of mounting mechanisms permits limited separation of the cab and frame to avoid transmission of forces from the frame to the cab.

In accordance with the present invention, a mounting arrangement is provided in which a tilt cab is supported at its rear by a pair of mechanisms which firmly secure the cab relative to the frame and which may be released for tilting of the cab. With the cab in a locked position, twisting of the frame is prevented from being transmitted to the cab by apparatus which is moved in response to frame deflection to release the cab and permit a limited amount of movement relative to the frame sufficient to accommodate frame twist and still retain the cab positively connected to the frame.

The above as well as other objects of the invention will become apparent from the following description, the appended claims and the accompanying drawings showing a preferred embodiment of the invention.

BRIEF DESCRIPTION OF THE DRAWINGS

FIG. 1 is a schematic view of a tilt cab vehicle;

FIG. 2 is a schematic view of the vehicle shown in FIG. 1 looking from the rear of the vehicle;

FIG. 3 is a side elevation of the mounting mechanism incorporating the present invention and associated with the left side of the vehicle;

FIG. 4 is an end elevation of the mounting shown in FIG. 3 as viewed from the rear of the vehicle and is shown in a different position of operation;

FIG. 5 is a cross-sectional view of the mounting in FIG. 4 but at an enlarged scale and in a different position of operation; and FIG. 6 is a broken away view of a portion of one of the elements seen in FIG. 5 and looking in the direction of the arrow 6.

DETAILED DESCRIPTION

Referring to the drawings and particularly to FIGS. 1 and 2, a motor vehicle in the form of a truck 10 includes a chassis frame 12 having a left side rail 14 and a right side rail 16. The frame 12 is supported relative to the road or operating surface by wheels 18. An operators cab 20 has its forward portion hinged at a point indicated generally at 21 to the side rails 14 and 16 to afford a transverse axis about which the cab 20 may be pivoted or tilted from the full line position toward and beyond the position indicated in broken lines in FIG. 1. Such hinge mechanism is conventional and is not fully described since it is not necessary to a full understanding of the invention.

The rear end of the tilt cab 20 is releasably secured and supported relative to the chassis frame 12 by means of a pair of mounting mechanisms 22 and 24 which embody the invention and which are associated with the left and right side rails 14, 16, respectively. The left mounting mechanism 22 will be described in detail but it will be understood that the right mounting mechanism 24 is a substantial duplicate thereof and is mounted in facing relation to the left mounting mechanism 22.

The mounting mechanism 22 includes a lock assembly 26 and a support assembly 28. Referring particularly to FIG. 3, the lock assembly 26 includes a housing bracket 30 rigidly connected by bolting or welding to the side of the rail 14. An hydraulic actuator 32 is mounted on the bracket 30 and has an actuating rod 34 pivotally connected at 36 to the lower end of a lever member 38 which has an intermediate portion pivoted on a pin 40 also supported by the bracket 30. The upper end of the lever member 38 forms a hook portion 42 which is adapted to engage a lock pin 44 forming part of the support assembly 28. The hook portion 42 is engaged and disengaged from the lock pin 44 by hydraulic pressure supplied from a hydraulic system not shown but conventionally used for this purpose and also to actuate the mechanism for tilting the relatively heavy tilt cab 20 relative to the chassis frame 12 after the hook 42 has been disengaged from the lock pin 44.

The support assembly 28 which is associated with the cab 20 and which includes the lock pin 44 also includes a box-like housing structure 46, a guide link 48, a master link 50 and a cab mounted bracket 52 all interconnected in a manner to be more fully described.

Referring to FIG. 5, the box housing 46 is formed with a slot 54 at its lower end which extends longitudinally of the side rail 14 and is adapted to provide passage for pivoting of the lever member 38 and hook portion 42. The lock pin 44 which is engageable by the hook 42 is supported horizontally and transversely to the side rail 14 in internal walls 56 and 58 and is secured thereto in a nonrotatable position by means of a roll pin 60. The bottom of the box housing 46 is also provided with an opening 62 to one side of the slot 54 which is adapted to receive a tapered locator pin 64 which is rigidly connected to the top of the bracket 30 of the lock assembly 26. The mating of the pin 64 in the opening 62 insures the proper location of the lock pin 44 for engagement by the hook 42.

As best seen in FIG. 3, a forward side wall 66 and a rearward side wall 68 are provided with bosses 70 which rotatably receive the opposite ends of a master pin 72 and support it in an axially fixed position extending longitudinally of the side rail 14. As seen in FIG. 5, the guide link 48 has one end mounted in axially fixed relation on pin 72 by means of a bolt 74 which passes through an annular slot (not shown) and interferes with the pin 72. Similarly, the lower end of the guide link 48 is secured in axially fixed relationship on a pin 76 by means of another interference bolt 78. The opposite ends of the pin 76 are rotatably received in a boss 80 seen in FIG. 4 and a boss 82 seen in FIG. 5 and formed in parallel spaced walls 84 and 86 of the master link 50 which has a generally U-shaped configuration as viewed from above. The opposite walls 84 and 86 also form a pair of elongated slots or openings 88 which freely receive the master pin 72. As seen in FIG. 5, the diameter of the master pin 72 is substantially less than the transverse width of the slots 88. The slots 88 are arcuate and are formed on a radius having its center at the pin 76. Movement of the master link 50 in a clockwise direction, as viewed in FIG. 5, about the pin 76 is prevented by engagement of the pin 72 with ends of the slots 88 and movement in the opposite direction is permitted for a limited extent but is limited by engagement of the pin 72 with the other ends of the slots.

The upper end of the master link 50 is provided with a pair of aligned bosses 90 which rotatably support still another pin 92 disposed with its axis in parallel relation to the axes of the pins 72 and 76. The cab bracket 52 has a depending portion 93 which is disposed between the walls 84 and 86 of the master link 50 and is connected to the pin 92 by another interference bolt 94. The upper end of the cab bracket 52 abuts a relatively hard rubber pad or cushion 95 and bolts 96 passing through the bracket 52 and pad 95 secure the entire support assembly 28 to the bottom and rear of the tilt cab 20.

Under normal conditions when the vehicle cab 20 is locked relative to the frame 12, the master link 50 and guide link 48 are intended to be capable of pivoting relative to each other. However, under certain conditions such as when the support assembly 28 is separated from the chassis frame 12 during tilting of the cab 20, it is desirable to restrain the relative movement of the links 48 and 50. As best seen in FIGS. 5 and 6, a T-shaped lock bar 97 is mounted within the box housing 46 for this purpose. The lock bar 97 includes a stem portion 98 having a slot 99 which slidably receives a shouldered pin 100 rigidly mounted to an inboard wall 102 of the box housing 46. The lower end of the stem 98 is provided with a flange 104 which acts as the seat for an end of a spring 106 having its opposite end seated against a wall of a recess 108 formed in the inboard wall 102 of the box housing 46. In the position shown, the spring 106 acts to urge the lock bar downwardly so that the lower end of the stem portion 98 engages the top surface of the bracket 30. The upper end of the stem 98 is provided with a cross bar 110 which is adapted to move downwardly under the influence of the spring 106 when the support assembly 28 is separated from its seated position on the lock assembly 26 so that the opposite ends of the cross bar 110 are received in facing slots 112 (only one of which is shown) formed in flanges 114 making up the borders of the arcuate slots 88. Shoulders 116 are formed on an outer portion of each of the flanges 114 and are adapted to act as seats for a pair of pins 118 rigidly fastened to the opposite ends of the cross bar 110 as seen in FIG. 6. The pins 118 engage the shoulders 116 to limit downward movement of the lock bar and insure proper location of the cross bar 110 in the slots 112.

When the tilt cab 20 is in its normal position fully supported and latched to the chassis frame 12, the hook member 38 is engaged with the lock pin 44 and the various parts occupy the position shown in FIGS. 3 and 5 with the axes of pins 72, 76 and 92 disposed parallel to each other and in a common vertical plane. Moreover, the hook 42 and pin 44 holds the support assembly 28 in metal to metal contact with the top of the bracket 30 mounted on the frame member 14 and the aligned pins 72, 76 and 92 serve to rigidly secure the rearward portion of the tilt cab 20 relative to the side rail 14. Normal road vibrations which are encountered during operation are absorbed by the relatively hard rubber cushion or pad 95.

Upon twisting of the frame 12 when the vehicle is operated on rough terrain or when one wheel is elevated above the level of the remaining wheels, the forward portion of the tilt cab 20 is completely restrained by the hinge points associated with opposite forward sides of the frame 12. However, at the rearward end of the cab, the latter will tend to remain supported at only one side of the frame 12 and separation must be made possible at the opposite side. If such separation is not provided, large twisting forces can be imposed on the tilt cab 20 causing distortion and permanent damage. During such twisting of the frame 12 it has been found that the side of the cab which tends to separate vertically from the frame also moves laterally inward. If for example, the left front wheel is raised above the level of the other wheels, the tilt cab will tend to retain its support at the forward hinge points and at the mounting mechanism 24 associated with the right frame member 16. The opposite side of the cab adjacent to the left support and lock mechanism 22 will strain to move both vertically upward and laterally inward relative to the side rail 14. Referring now to FIG. 5, such action will in effect cause the pin 92 to be urged upwardly but such movement is initially prevented by the alignment of the pins 72, 76 and 92 so that the vertical forces in the links 48 and 50 must pass through all three of the aligned pins thereby resisting displacement of the links 48 and 50. The lateral displacement of the cab relative to the frame 12 will cause the pin 92 to move to the right as viewed in FIG. 5. In so doing, a tab 120 formed at the bottom of the cab bracket 52 will come into engagement with another tab 122 formed at the upper end of the guide link 48. The master pin 72 is stationary and prevents movement of the master link 50 to the right by engagement of pin 72 with the ends of slots 88 so that continued movement of the pin 92 to the right causes the guide link to be pivoted about the master pin 72 in a clockwise direction. When such movement begins, the pin 76 will be moved to the left out of the plane of the other two pins 72 and 92 and the vertical forces tending to separate the cab 20 and frame 12 will swing the pin 76 and guide link 48 even farther in a clockwise direction. At the same time, the master link 50 pivots relative to the upper pin 92 and the lower pin 76 so that the parts move toward the position illustrated in FIG. 4. In that position it will be noted that the pin 92 which moves with the cab 20 has moved both upwardly and laterally inward or to the right from its original position. Such displacement of the pin 92 and cab 20 can continue until the end 124 of the arcuate slots 88 come into engagement with the pin 72 and it has been found that such displacement accommodates the most extreme frame twist and prevents loads from being imposed on the cab 20 which otherwise might cause distortion and damage.

After the twisting condition of the frame 12 is eliminated, as for example when all of the wheels 18 return to the same level, the weight of the cab 20 causes the master link 50 and guide link 48 to return to their original positions as shown in FIG. 5 with pins 72, 76 and 92 in alignment so that vertical movement of the cab 20 and bracket 52 relative to the side rail 14 and lock bracket 30 is resisted through the medium of the links 48 and 50.

During release of the support assembly 28 upon excessive twisting of the frame 12 it will be noted that the cab is permitted a limited movement relative to the side rail 14 but at the same time remains positively connected thereto. In an actual embodiment of the invention used on a heavy duty truck it was found that a vertical separation of about one and one-eighth of an inch between the cab 20 and the associated side rail was adequate to accommodate excessive frame twisting.

Referring again to FIG. 5, it will be noted that the tabs 120 and 122 are separated a small distance from each other. This spacing permits a limited amount of lateral movement of the cab associated pin 92 when the frame 12 twists small amounts under normal operating conditions and which would not be severe enough to distort or damage the cab 20. However, excessive twisting will cause the tabs 120 and 122 to engage and release the links 48 and 50 from the position illustrated in FIG. 5 to permit the cab 20 to separate a limited amount from the side rail 14 or 16.

When the cab 20 is to be tilted about its forward end to afford access to the engine area of the vehicle, it is necessary to first disengage the hook 42 from the lock pin 44 in each of the mounting mechanisms 22 and 24. This is accomplished by simultaneously introducing hydraulic pressure to the hydraulic actuators 32, one of which is associated with each of the mounting mechanisms 22 and 24. Upon disengagement of the hooks 42, the support assemblies 28 are free to completely separate from the associated lock assemblies 26 so that the support assemblies 28 move with the cab 20 as it moves toward and beyond the position indicated by a broken line in FIG. 1.

Upon tilting of the cab 20 and separation of the support assembly 28 from the lock assembly 26, the T-shaped lock bar 97 will be urged downwardly from the position shown in FIG. 5 by the spring 106 and will protrude from the bottom of the box housing 46. The pins 118 in the cross bar 110 will also move downwardly and come into engagement with the shoulders 116 so that the opposite ends of the cross bar 110 will be positioned in the slots 112 formed in the flanges 114 defining the perimeter of the arcuate slots 88. This retains the master link 50 in a fixed position relative to the housing 46 so that the master link 50 and the guide link 48 are not free to move. As a consequence, the pins 72, 76 and 92 are maintained in alignment and when the cab 20 is returned toward its seated position on the frame 12 and the locator pin 64 on the bracket 30 enters the opening 62 and guides the support assembly 28 to its proper position relative to the bracket 30 and the side rail 14. At the same time, the bottom end of the lock bar 97 engages the bracket 30 and is moved upwardly against the resistance of the spring 106 to assume the position illustraed in FIG. 5 in which the master link 50 is freed for movement. Upon subsequent retraction of the rod 34 of the actuator 32, the hook 42 is engaged with the lock pin 44 so that the cab 20 is fully supported and connected to the frame 12 so that the vehicle may be operated.

It will now be seen that a mounting mechanism has been provided by which a tilting vehicle cab may be positively restrained relative to the vehicle frame during normal operations and when excessive frame twisting occurs a limited amount of cab displacement is permitted to preclude damaging cab distortion and still maintains a positive connection between the cab and frame.

What is claimed is:

1. A mounting mechanism for detachable securing a tilting cab on the chassis frame of a motor vehicle comprising, a first pivot element adapted to be releasably supported in a fixed position relative to said frame for release upon tilting of said cab relative to said frame, a second pivot element adapted to be supported in a fixed position relative to said cab, a guide link pivotally connected to said first pivot element, a master link connected to said second pivot element, and a third pivot element connecting said links to each other for relative movement thereof, all of said pivot elements having pivot axes disposed parallel to each other and normally being disposed in a common plane to position said links to restrain movement of said first pivot element relative to said second pivot element, said guide link being movable in response to movement of said first and second pivot elements laterally of each other to move said third pivot element out of said plane and permit limited separation of said first and second pivot elements relative to each other when said first pivot element is in said fixed position relative to said frame.

2. The combination set forth in claim 1 and further comprising an opening formed in said master link, said first pivot element passing through said opening for limited movement between a first position in which all of said pivot elements are in said plane and a second position in which said second pivot element has moved away from said first pivot element.

3. A mounting mechanism as set forth in claim 2 in which said opening formed in said master link is in the form of an elongated slot receiving said first pivot element and in which the latter is disposed at one end of said slot when said first, second and third pivot elements are disposed in said plane and in which said first pivot element is movable toward the other end of said slot when said third pivot element moves out of said plane.

4. The mounting mechanism set forth in claim 3 in which said slot is arcuate about a radius having its center at said third pivot element.

5. The mounting mechanism set forth in claim 3 and further comprising means for moving said third pivot means out of said plane in response to lateral movement of said cab relative to said frame.

6. A mounting mechanism as set forth in claim 5 in which said means for moving said third pivot means includes a tab portion associated with said second pivot element and a complementary tab portion associated with said guide link, said tab portions being engageable with each other upon said lateral movement of said cab and said frame.

7. A mounting mechanism for a tilting cab mounted on the frame of a vehicle comprising; a housing, means detachably connecting said housing to said frame and being detachable for tilting of said cab relative to said frame, a guide link pivotally connected to said housing for movement about a first axis fixed relative to said housing, a master link connected to said guide link for pivotal movement about a second axis and being connected to said cab for pivotal movement about a third axis, said first, second and third axes normally being disposed in a common plane and in parallel relation to each other whereby said guide and master links are positioned to restrain displacement of said third axis relative to said first axis, means associated with said guide link and operative to move the latter and said second axis out of said plane upon lateral displacement of said third axis relative to said first axis upon twisting of said frame relative to said cab to permit limited vertical displacement of said first and third axes relative to each other when said housing is connected to said frame.

8. The mounting mechanism set forth in claim 7 and further comprising lock means associated with said housing and being operative upon detachment of said housing from said frame to prevent movement of said master link and maintain said first, second and third axes in said common plane.

9. The mounting mechanism set forth in claim 8 in which said lock means includes a lock element disposed in spaced relationship to said master link when said housing is connected to said frame and being movable into engagement with said master link upon disengagement of said housing from said frame.

10. The mounting mechanism set forth in claim 7 in which a pin establishes said first axis and in which said master link forms a slot receiving said pin, said master link normally being positioned with said pin at one end of said slot to prevent movement of said master link in one direction and to permit movement in the opposite direction for movement of said second pivot means out of said plane.

* * * * *